(12) United States Patent
Geffner et al.

(10) Patent No.: US 7,802,299 B2
(45) Date of Patent: Sep. 21, 2010

(54) BINARY FUNCTION DATABASE SYSTEM

(75) Inventors: Jason Geffner, Bothell, WA (US); Ning Sun, Bellevue, WA (US); Brad Albrecht, Snohomish, WA (US); Tony Lee, Sammamish, WA (US); Pat Winkler, Redmond, WA (US); Chengyun Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 11/784,801

(22) Filed: Apr. 9, 2007

(65) Prior Publication Data

US 2008/0250018 A1    Oct. 9, 2008

(51) Int. Cl.
*G06F 11/00*    (2006.01)
(52) U.S. Cl. ............... 726/22; 726/23; 726/24
(58) Field of Classification Search ............. 726/22–26; 713/176, 181, 187–188
See application file for complete search history.

(56) References Cited

U.S. PATENT DOCUMENTS

| | | | |
|---|---|---|---|
| 4,694,420 | A | 9/1987 | Pettet et al. |
| 6,016,546 | A | 1/2000 | Kephart et al. |
| 6,151,701 | A | 11/2000 | Humphreys et al. |
| 6,338,141 | B1 | 1/2002 | Wells |
| 6,393,606 | B1 | 5/2002 | Davila et al. |
| 6,622,150 | B1 | 9/2003 | Kouznetsov et al. |
| 6,748,584 | B1 | 6/2004 | Witchel et al. |
| 7,051,322 | B2 | 5/2006 | Rioux |
| 7,287,279 | B2 * | 10/2007 | Bertman et al. ............... 726/23 |
| 2003/0212913 | A1 | 11/2003 | Vella et al. |

FOREIGN PATENT DOCUMENTS

WO        WO 9001738 A1    2/1990

OTHER PUBLICATIONS

Christodorescu, et al., "Semantics-Aware Malware Detection", Proceedings of the 2005 IEEE Symposium on Security and Privacy, May 2005, pp. 32-46 (15 pages), ACM Press, Oakland, CA.
Wang, et al., "SigFree: A Signature-free Buffer Overflow Attack Blocker", last modified on May 11, 2006, 19 pages, Pennsylvania State University, Pittsburgh, PA.
"Using SABRE BinDiff v1.6 for Malware analysis", http://www.zynamics.com/files/Bin.Diff_Malware.pdf, last viewed on or about Feb. 12, 2007, 3 pages.

(Continued)

*Primary Examiner*—Hosuk Song

(57) ABSTRACT

A binary function database system is provided in which binary functions are extracted from compiled and linked program files and stored in a database as robust abstractions which can be matched with others using one or more function matching heuristics. Such abstraction allows for minor variations in function implementation while still enabling matching with an identical stored function in the database, or with a stored function with a given level of confidence. Metadata associated with each function is also typically generated and stored in the database. In an illustrative example, a structured query language database is utilized that runs on a central database server, and that tracks function names, the program file from which the function is extracted, comments and other associated information as metadata during an analyst's live analysis session to enable known function information that is stored in the database to be applied to binary functions of interest that are disassembled from the program file.

18 Claims, 5 Drawing Sheets

OTHER PUBLICATIONS

Zimmer, "ID A Compare Helpfile", http://www.labs.idefense.com/files/labs/releases/previews/IDACompare/, last viewed on Jun. 22, 2010, 4 pages.

"Zynamics BinDiff", http://www.zynamics.com/bindiff.html, last viewed on Jun. 22, 2010, 4 pages.

Dullien, et al., "Graph-based comparison of Executable Objects", http://www.zynamics.com/downloads/bindiffsstic05-1.pdf, 2005, 8 pages.

Flake, "Structural Comparison of Executable Objects", http://www.zynamics.com/downloads/dimva_paper2.pdf, 2004, 13 pages.

* cited by examiner

BINARY FUNCTION DATABASE SYSTEM

BACKGROUND

Malicious software, or "malware," is a term which generally describes software that is purposefully designed to cause disruption and problems on the computers and systems on which it runs. Malware includes, for example, viruses, worms, trojan horses, rootkits, adware, spyware, bots, and other destructive software forms. Malware can cause significant damage in the form of disabled or corrupted firmware, software applications or systems, lost or damaged data, data theft and loss of security (e.g., increased vulnerability) for systems or data, among other problems. Such damage is not necessarily limited to individual computer systems given today's high level of interconnectivity among computers through various networks including the Internet. As a result, significant resources are expended to identify and analyze malware to be able to develop solutions and address areas of vulnerabilities. Analysts are also interested in understanding how various malware variants may be clustered into families based on their functionalities.

Malware analysts often spend significant amounts of time analyzing disassembled functions from files which may contain malware. While current tools let analysts save their chosen function names and comments in a disassembly database, such tools only allow for a one-to-one relationship between the disassembly database and the malware files. Thus, a function of interest can be compared against another function and the current tools will determine if the two functions are the same or not. However, analyses performed by malware analysts do not persist across disassemblies of many different files that contain similar functions. In addition, current tools for clustering binary functionality to identify families of malware use static analyses that do not scale well, or can return unreliable results because many different families have near-identical characteristics when subjected to dynamic analyses.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A binary function database system is provided in which binary functions are extracted from compiled and linked program files and stored in a database as robust abstractions which can be matched with others using one or more function matching heuristics. Such abstraction allows for minor variations in function implementation while still enabling matching with an identical stored function in the database, or with a stored function with a given level of confidence. Metadata associated with each function is also typically generated and stored in the database.

In an illustrative example, a structured query language ("SQL") database is utilized that runs on a central database server, and that tracks function names, the program file from which the function is extracted, comments and other associated information as metadata during an analyst's live analysis session to enable known function information that is stored in the database to be applied to binary functions of interest that are disassembled from the program file. In another illustrative example, each extracted binary function is subjected to a smart hash technique in which all references to memory addresses are masked out, and the resulting instruction stream is hashed and used as a look up or an update into the database. The functions and associated metadata are stored in the database in a file-agnostic manner so that multiple remote analysts may save and retrieve function information, to and from the database server, for matching functions across multiple different files, and in real-time.

The database of functions and associated metadata advantageously enables functions to be cross-referenced so that comparison of functions can be scaled across multiple files (i.e., on a one-to-many or a many-to-many basis). Persisted analyses of functions is thereby enabled as well as clustering to determine a probable functionality of an unknown file based on known functionality of other files that are contained in the database. In addition, the database is usable to assist in automated malware signature generation and malware signature false-positive detection since analysts are provided with the ability to mark functions as either suitable or not suitable as a signature hash object (i.e., whether the signed code is suitable for the signature's hash range).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
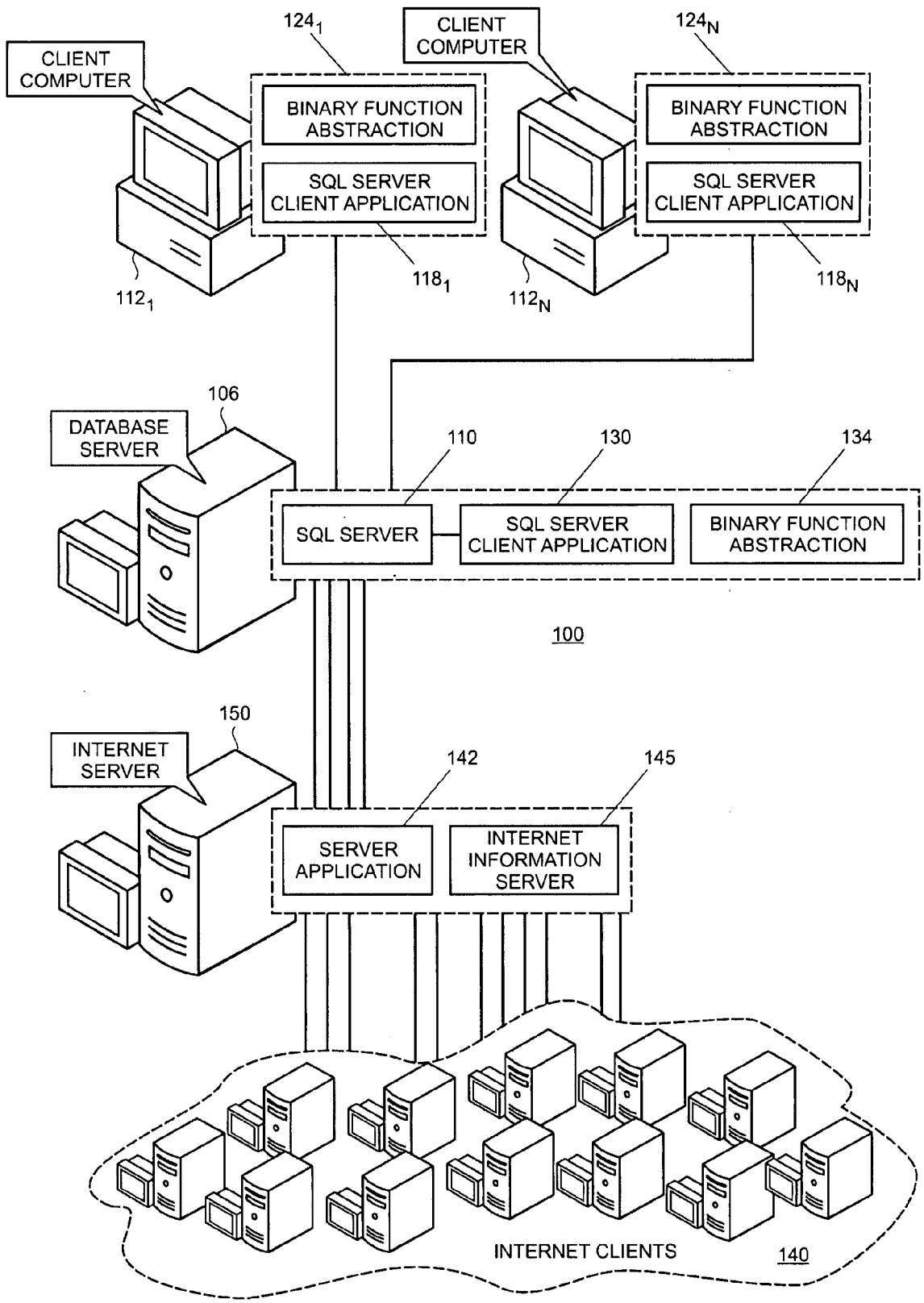
FIG. 1 is a diagram of an illustrative client-server environment that supports the present binary function database system.

FIG. 1 is a diagram of an illustrative client-server environment 100 that supports the present binary function database system. In this illustrative example, a central database server 106 runs a database application that is typically arranged as a structured query language-type ("SQL") application such as Microsoft SQL Server™ as indicated by reference numeral 110. Database server 106 also stores a binary function database that is accessed and manipulated by SQL Server 110 in order to display data to users and enable users to perform database operations such as lookups and updates.

The binary function database supported by the database server 106 is arranged to be accessed as a resource that is accessible by a number of users such as malware analysts, and typically, many users that may work for the same, or different organizations. Several such users are provided with access, as shown in FIG. 1, using client computers $112_1 \ldots 112_N$ that are each configured with an SQL Server client application $118_1 \ldots 118_N$ that connects over a network to the database server 106 and SQL server 110.

The SQL Server client application 118 is arranged, in this illustrative example, with both database logic and code to display output to the user. SQL Server client application 118 is thus said to be a "thick client." Each client computer 112 is also arranged with a binary function abstraction module 124₁ ... 124_N that generates binary function abstractions from binary files containing malware for update or lookup into the database as described in more detail in the text accompanying FIG. 3 below. In some implementations of the present binary function databases system, the SQL server client and binary function abstraction module are implemented using standalone software applications. In other implementations, the SQL Server client 118 may be embedded into the binary function abstraction module. SQL Server applications also can optionally be run on the same computer as SQL Server, as shown in FIG. 1 where an SQL server client 130 and binary function abstraction module 134 communicate with SQL Server 110 typically using a Microsoft Windows® Interprocess Communications Component ("IPC") such as shared memory instead of a network connection.

The client-server environment 100 is also arranged to support a multi-tiered client-server architecture that is particularly appropriate to Internet-supported applications of the present binary function database system. In this multi-tiered architecture, the client application logic is separated into two locations (i.e., tiers): a) a thin client that is run on a malware analyst's local computer (i.e., one of the Internet clients 140 in FIG. 1) which focuses on displaying results; and, b) the database logic that runs in a server application, such as a server application 142 or Internet information server 145, on an Internet server 150. The thin client requests functions from the server application, which is itself a multithreaded application capable of working with many concurrent users. The server application opens connections to the database server 106 over a network. Each of the Internet clients 140 is also typically arranged with a binary function abstraction module (not shown).

Figure 2:
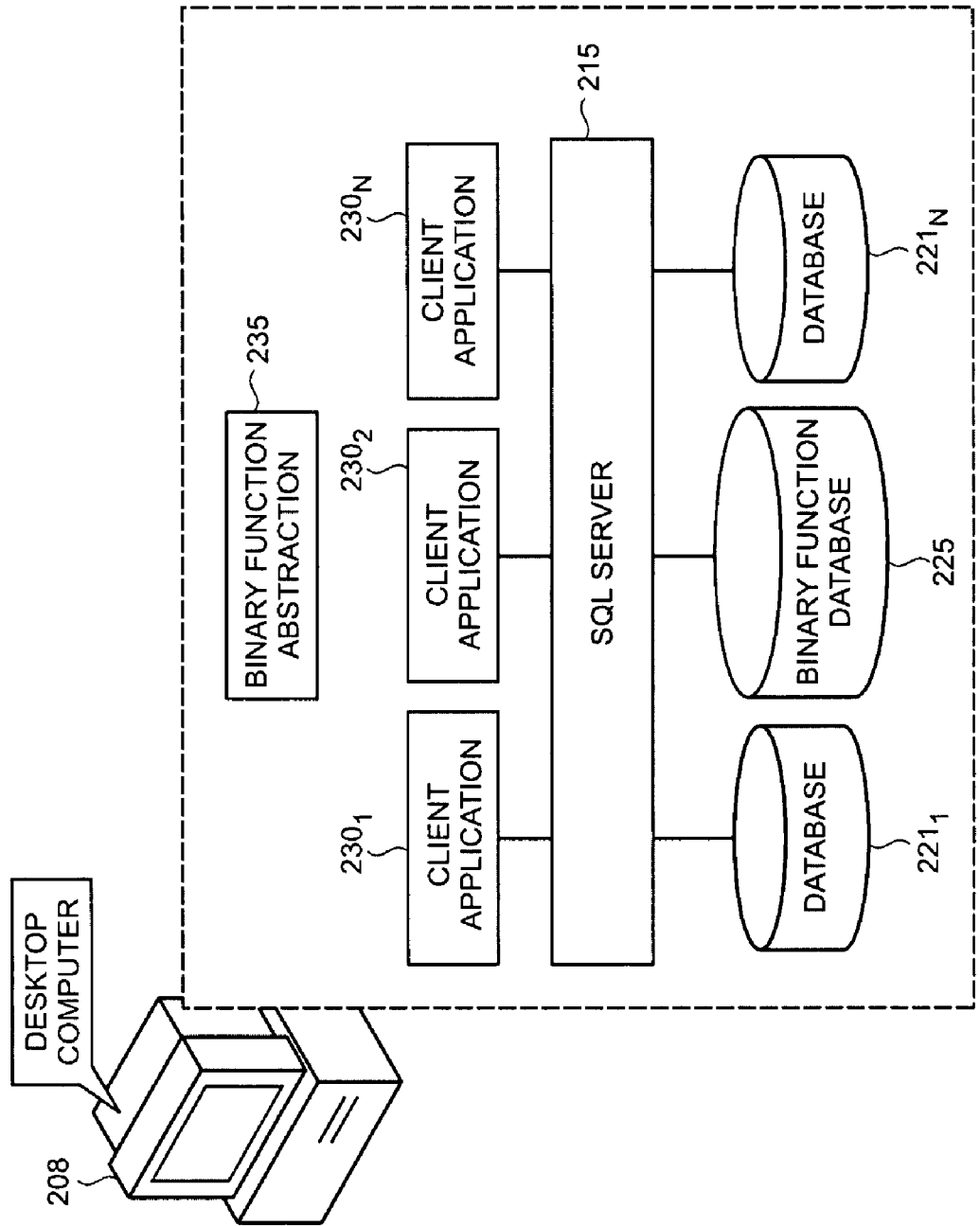
FIG. 2 shows an illustrative desktop database system that may be alternatively utilized to support the present binary function database system.

While a client-server environment using a central database server and a multiplicity of distributed clients is preferable in many applications of the present binary function database system, some applications may be more appropriately supported by an arrangement in which a stand-alone database is stored locally on a desktop computer 208, as shown in FIG. 2. Here, a single instance of SQL Server 215 is utilized even in cases, as with this illustrative example, when more than one database 221₁ ... N is supported by the desktop computer 208 in addition to a binary function database 225. Client applications 230₁ ... N connect to the SQL Server 215 in much the same way as they do in the client-server environment shown in FIG. 1 and described in the accompanying text. A binary function abstraction component 235 is also supported by the desktop computer 208.

Figure 3:
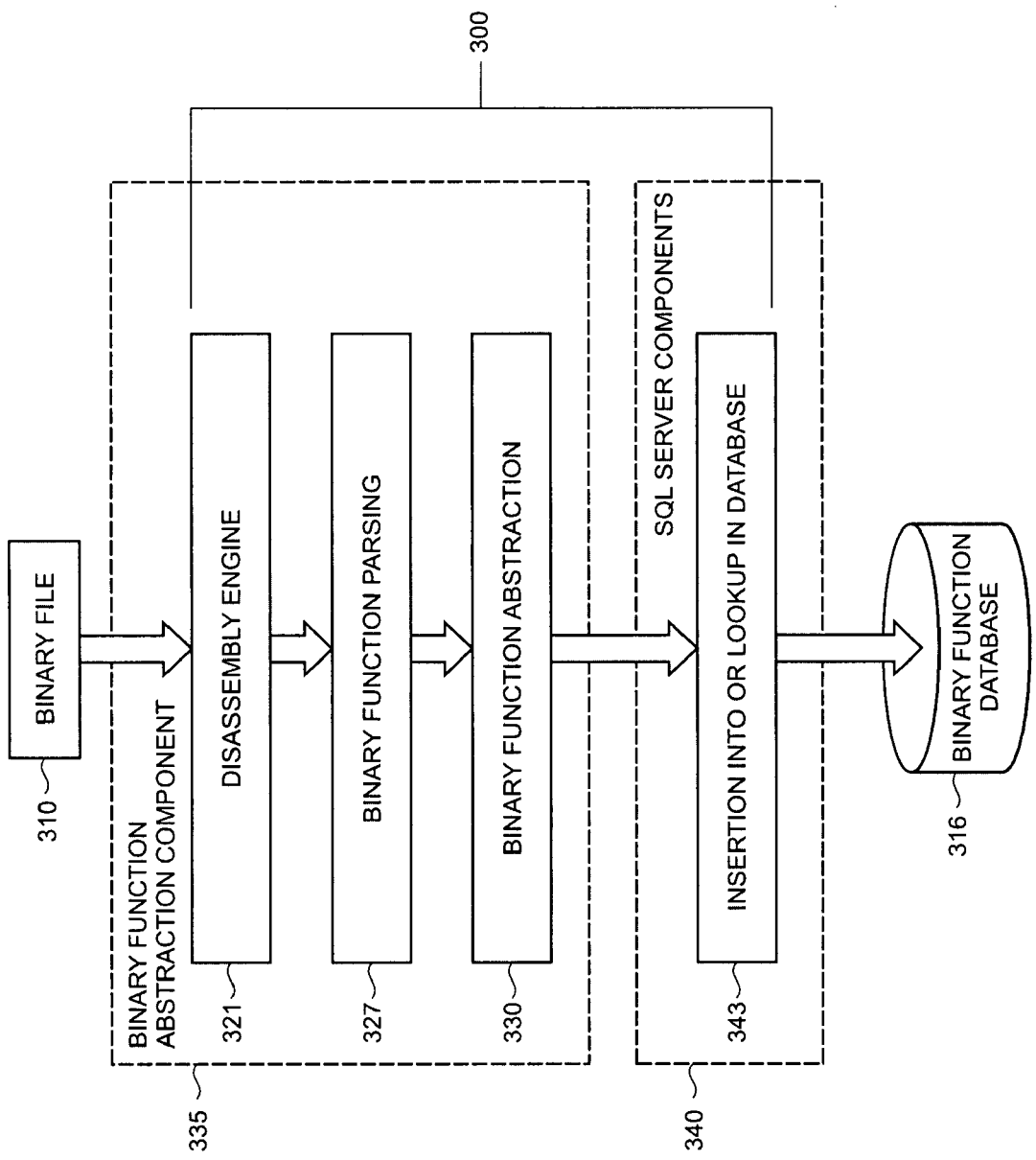
FIG. 3 shows an illustrative set of functional modules that process a binary file into binary function abstraction for an update or lookup in a binary function database.

FIG. 3 shows an illustrative set of functional modules 300 that process a binary file 310 into binary function abstraction for an update or lookup (i.e., a query) in a binary function database 316. Functional modules 300 are generally provided to one or more of the client computers 112, the database server 106, or the Internet clients 140 shown in FIG. 1 so that the present binary function database system may be utilized by malware analysts at such locations.

Functional modules 300 include a disassembly engine 321, a binary function parsing module 327, and a binary function abstraction module 330 that arranged, in this illustrative example, as objects in a binary function abstraction component 335. SQL Server modules 340 (i.e., SQL Server and SQL Server client application) operate to insert robust abstractions of functions contained in the binary file 310 into the binary function database 316 or use such abstractions as lookups in the database to find a matching function. This update or lookup is performed using a database module 343 in FIG. 3. Note that the arrangement of functional modules 300 may vary from that shown, depending on the requirements of a specific application of the binary function database system. For example, as noted above, various functionalities provided by the SQL server modules 340 may be embedded with those provided by the binary function abstraction component 335.

Figure 4:
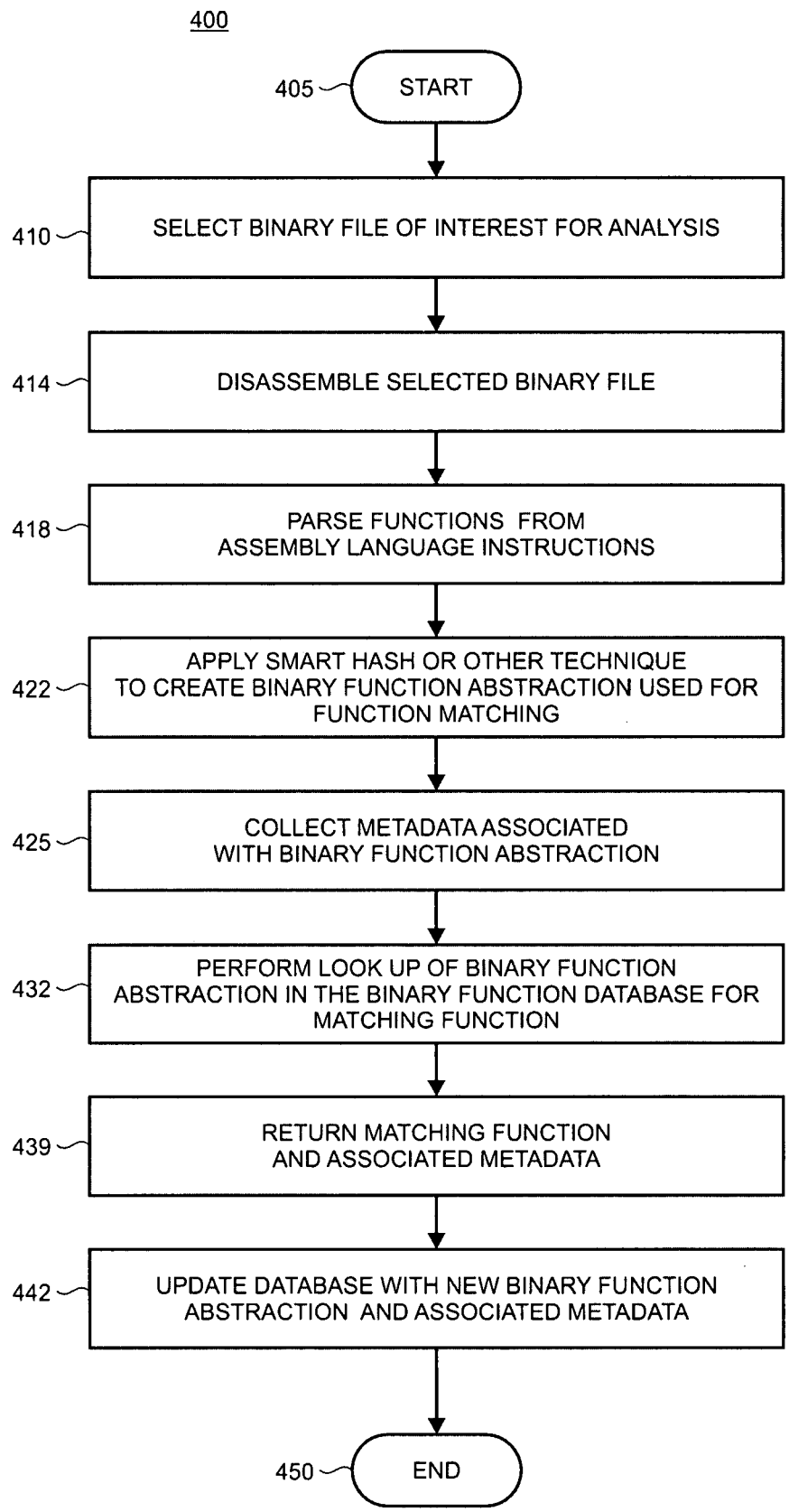
FIG. 4 depicts a flowchart for an illustrative method that may be performed by the functional modules shown in FIG. 3.

FIG. 4 depicts a flowchart for an illustrative method 400 that may be performed by the functional modules 300 shown in FIG. 3. The method starts at block 405. At block 410, a malware analyst selects a binary file (e.g., binary file 310) that is of interest to be analyzed. Binary file 310 contains binary information that performs various functions when run on a computer. As used herein, a function is a sequence or block of instructions which performs a specific task, generally as part of a larger program, and which has a well defined entry and exit point. Binary file 310 typically represents a malware sample that is associated with either a clean program file (e.g., a program such as a word processor or spreadsheet that is not intended to be malicious), or a malicious program file that is known to have malicious intent. However, it is noted that the malware sample may be associated with an unknown file (that is, it is not necessary to have a priori knowledge that a particular file containing the malware is clean or malicious).

At block 414, the selected binary file 310 is disassembled by the disassembly engine 321 into an assembly language instruction stream. The assembly language is parsed, as shown at block 418, by the binary function parsing module 327 to locate each of the functions contained in the assembly language instructions.

At block 422, one of several alternative techniques, or a combination of techniques is applied by the binary function abstraction module 330 to a function parsed from the assembly language instructions to create a binary function abstraction. Utilization of the abstraction enables heuristic-based function matching against data associated with other such functions in the binary function database 316.

In one illustrative example, a smart hash technique is utilized which may perform well in many applications. With this technique, all references to memory addresses used by the function are identified and then masked out (i.e., removed). These memory references may include absolute memory references in the instructions, and/or relative inter-function memory references. The masking is intended to address the likelihood that memory addressing will differ with different compilations of the program containing the function of interest. That is, a compiler and linker on one computer will arrange memory differently when compiling the source code for the program than the compiler and linker on another computer. The masked out instructions are converted to binary and then hashed using a conventional hash algorithm such as CRC32, MD5, SHA-1, etc., to thereby generate the abstracted binary function. Application of the hash algorithm reduces the size of the function's instruction stream and generally makes the binary function database system more performant.

In alternative implementations, other techniques or combinations of techniques may be used to generate the binary function abstraction, and also be utilized as function matching heuristics applied to lookups in the binary function database. These techniques include, for example, using a) string references; b) API (application programming interface) references; c) constant references; d) caller and callee function IDs; e) small prime products of opcode (operational code); f)

a shortest path to function exit; g) stack frame size; g) percentage of callers; and h) emulation results.

Figure 5:
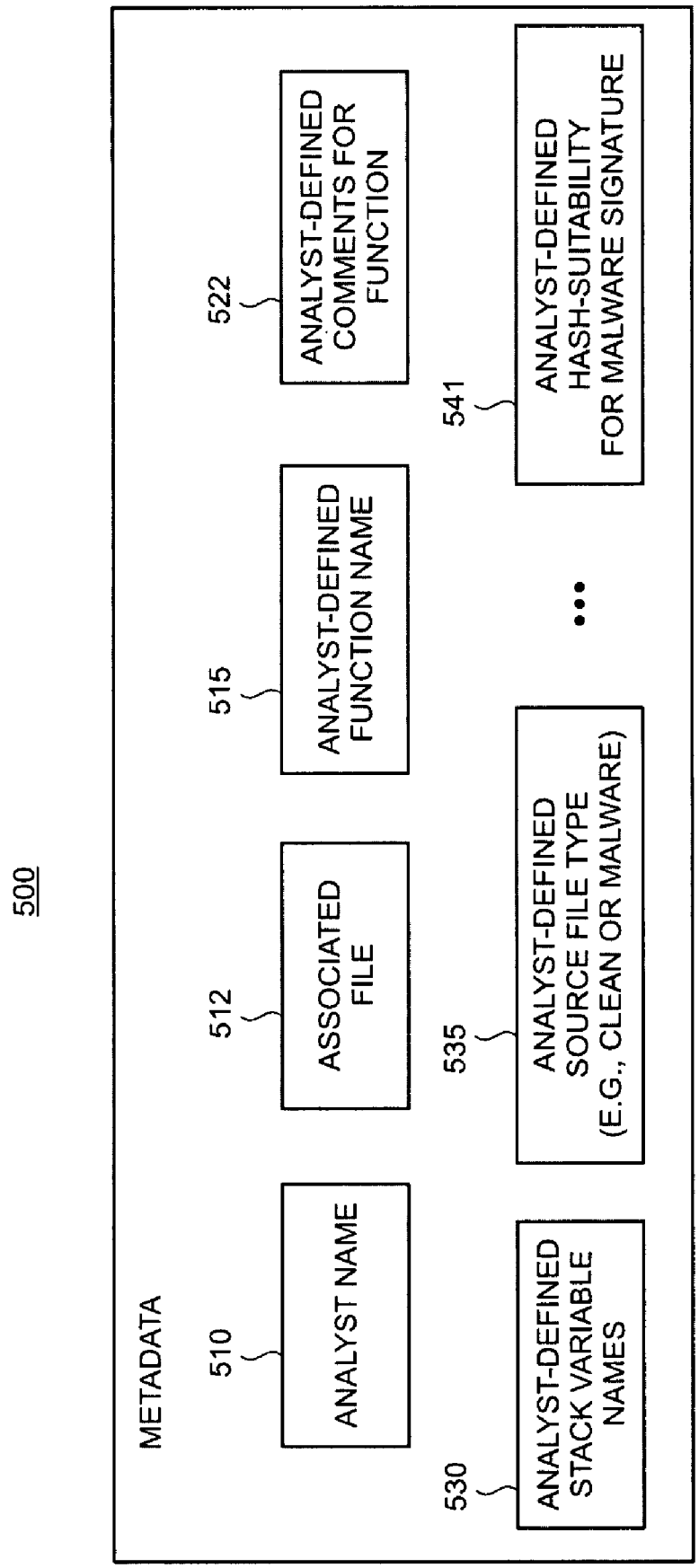
FIG. 5 shows an illustrative set of fields for defining metadata that is associated with a given binary function abstraction.

At block 425, metadata is collected by the binary function abstraction module 330 that is associated with the binary function abstraction. FIG. 5 shows an illustrative set of fields 500 for defining metadata that is associated with a given binary function abstraction. The metadata may typically be used as a data source for a variety of manual and automated malware analyses, but is not required to be used in all applications of the present binary function database system.

The metadata, in this illustrative example, includes metadata that is generated by a user, such as a malware analyst, and also metadata that is automatically generated, such as the user's name in field 510 and identification of the program file from which the function came in field 512 (such file identification field may also be manually populated in an alternative implementation). It is emphasized that the particular metadata fields used, and the combination of user-generated and automatically generated metadata can vary from those shown in FIG. 5 and may be adapted in general to meet the particular needs of a specific application.

Metadata field 515 provides for a function name defined by the malware analyst that describes what the function does. Detailed comments associated with the function are populated in metadata field 522. Stack variable names are defined by the analyst using metadata field 530. The analyst may also identify whether a given function came from a clean file or from a malware file in metadata field 535.

Metadata field 541 provides for the analyst to mark a function's library code as suitable or not for signature hash-range. As noted above, such metadata may be used to support both manual and automated analyses. Here, metadata field 541 may be used to assist automated malware signature generation and/or automated detection of instances of false positive identification of malware in clean code.

Returning back to FIG. 4, at block 432, the malware analyst performs a database lookup for a stored function that matches the function of interest. The lookup is performed utilizing the database module 343 that generally applies function matching heuristics to allow for minor variations in an actual function implementation, while still enabling matching to the same stored function in the database, or to a stored function with a given level of confidence. As noted above, in this particular illustrative example, a smart hash is utilized to generate the binary function abstraction. Accordingly, the lookup will entail searching the binary function database 316 for a matching hash value.

At block 439, if a matching function is located, all metadata associated with the matching function is returned to the analyst by the SQL Server components 340 to thus identify all of the various program files that contain the function of interest. The binary function database 316 is then updated, as indicated at block 442, with the new binary function abstraction of the function of interest and the associated metadata. The illustrative method 400 ends at block 450.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for collecting functions from a plurality of malware files into a database, the collected functions being expressed by respective function abstractions, the method comprising the steps of:

disassembling a file containing suspected malware into an assembly language instruction stream;

generating an abstraction for a function of interest, the function of interest being parsed from the assembly language instruction stream from the disassembled file; and cross referencing the collected functions in the database to the function of interest by invoking a comparison of the abstraction of the function of interest to the abstracted functions in the database.

2. The computer-implemented method of claim 1 including a further step of receiving results of the cross referencing in response to a query to the database, the results including metadata associated with an abstracted function in the database that matches the abstraction of the function of interest.

3. The computer-implemented method of claim 2 in which the metadata comprises one of function name, identification of a file associated with the function, comment, stack variable name, source file type, or suitability of signature hash range.

4. The computer-implemented method of claim 2 including a further step of receiving input from a user, the input being used to populate one or more fields in the metadata associated with the function of interest.

5. The computer-implemented method of claim 4 including a further step of updating the database with the abstraction and metadata that includes the one or more populated fields.

6. The computer-implemented method of claim 1 in which the comparison comprises applying a function matching heuristic to accommodate variations in function implementation, or to perform function matching to a level of confidence.

7. The computer-implemented method of claim 1 in which the generating uses one of smart hash, string references, API references, constant references, caller or callee function IDs, small prime products of opcode, a shortest path to function exit, stack frame size, percentage of callers, or emulation results, that are contained in the assembly language instructions.

8. A computer-implemented method of operating a binary function database, the method comprising the steps of:

storing in the database a plurality of binary function abstractions, each abstraction having associated metadata that describes at least a program file from which a binary function underlying the abstraction is extracted;

receiving an abstracted binary function and associated descriptive metadata for inclusion in the database; and providing a record from the database, responsively to a lookup, the record including a stored abstraction that matches the lookup through application of heuristic function matching to the plurality of stored binary function abstractions, wherein the database is supported with a thick client client-server architecture with a central database server and at least one client in the thick client client-server architecture is arranged with a binary function abstraction module for generating an abstracted binary function that is storable in the database.

9. The computer-implemented method of claim 8 further in which the heuristic function matching uses one of, or a combination of smart hash, string references, API references, constant references, caller or callee function IDs, small prime products of opcode, a shortest path to function exit, stack frame size, percentage of callers, or emulation results, that are contained in the assembly language instructions.

10. The computer-implemented method of claim 8 including a further step of providing metadata responsively to the lookup.

11. The computer-implemented method of claim 8 in which the database is supported with a multi-tiered client-server architecture and at least one client in the multi-tiered architecture is arranged with a binary function abstraction module for generating an abstracted binary function that is storable in the database.

12. The computer-implemented method of claim 8 in which the database is utilized to support an activity selected one of malware classification, collaborative reverse engineering, clustering, or false positive prevention.

13. The computer-implemented method of claim 8 in which the received metadata is auto-generated by a client, or generated by a user operating the client.

14. A software system for generating an abstracted function usable for querying and updating a binary function database, the software system comprising:

a computer comprising the binary function database:

a disassembly engine for disassembling a suspected malware sample into a stream of assembly language instructions;

a binary function parsing module for parsing a function from the instructions;

a binary function abstraction module for abstracting the function and for associating metadata with the abstracted function, the metadata describing the function, wherein the abstracting comprises masking memory references used by the function in the assembly language instructions; and a database module for interfacing with the database, the interfacing including performing a query to the database, or updating the database with the abstracted function and associated metadata.

15. The software system of claim 14 in which the query comprises a lookup in the database for a stored function that matches the parsed function, the lookup being performed on a one-to-many basis.

16. The software system of claim 14 in which the memory references comprise one of absolute memory references in the instructions, or relative inter-function memory references.

17. The software system of claim 14 in which the masked assembly language instructions are converted to a binary file that is hashed with a hashing algorithm.

18. The software system of claim 17 in which the hashing algorithm is selected from one of CRC32, MD5, or SHA-1.

* * * * *